United States Patent [19]

Akridge

[11] Patent Number: 4,465,746

[45] Date of Patent: Aug. 14, 1984

[54] VITREOUS SOLID LITHIUM CATION CONDUCTIVE ELECTROLYTE

[75] Inventor: James R. Akridge, Parma, Ohio

[73] Assignee: Union Carbide Corporation, Danbury, Conn.

[21] Appl. No.: 509,132

[22] Filed: Jun. 29, 1983

[51] Int. Cl.$^3$ .............................................. H01M 6/18
[52] U.S. Cl. ..................................... 429/191; 429/218
[58] Field of Search ........................ 429/191, 218, 193

[56] References Cited

U.S. PATENT DOCUMENTS

| | | | |
|---|---|---|---|
| 4,042,482 | 8/1977 | Shannon et al. | 429/191 |
| 4,331,750 | 5/1982 | Malugani et al. | 429/193 |
| 4,397,924 | 8/1983 | Rea et al. | 429/191 |

OTHER PUBLICATIONS

Barrou et al., Sulfide Glasses: Glass Forming Region Structure and Ionic Conduction of Glasses In Ha$_2$'-s-XS$_2$(X=Si; Ge), Na$_2$S-P$_2$S$_5$ and Li$_2$S-GeS$_2$ Systems Journal of Non Crystalline Solids 38 to 39 (1980), 271-276.

Kawamoto et al., Silver Diffusion in As$_2$S$_3$-Ag$_2$S, GeS$_2$-GeS-Ag$_2$S, and P$_2$S$_5$-Ag$_2$S Glasses—Physics and Chemistry of Glasses, vol. 18, No. 1, Feb. 1977.

Higgins, Recent Results on Lithium Ion Conductors—Electrochimica Acta, 1977, vol. 22, pp. 773-781.

Ribes et al., Synthese, Structure et Conduction Ionique de Noveaux Verres a Base de Sulfures, Revue de Chimie Minerale, t 16, 1979, p. 339.

*Primary Examiner*—Donald L. Walton
*Attorney, Agent, or Firm*—Cornelius F. O'Brien

[57] ABSTRACT

A solid state electrolyte for solid state cell systems comprising a vitreous lithium cation conductor of the composition SiS$_2$, xLi$_2$S, yLiI where x is from 0.8 to 1.5, where y is from 0 to about 2 and wherein said composition has a conductivity of at least $0.75 \times 10^{-4}$ ohm$^{-1}$ cm$^{-1}$ at 25° C.

17 Claims, No Drawings

VITREOUS SOLID LITHIUM CATION CONDUCTIVE ELECTROLYTE

DESCRIPTION OF THE INVENTION

1. Technical Field

The invention relates to a solid state electrolyte based on vitreous lithium cation conductor of the composition:

$$SiS_2, xLi_2S, yLiI$$

where
x is from 0.8 to 1.5,
y is from 0 to about 2 and
wherein said composition has a conductivity of at least $0.75 \times 10^{-4}$ ohm$^{-1}$ cm$^{-1}$ at 25° C.

2. Background of the Art

Ionic conductivity is usually associated with the flow of ions through a liquid solution of salts. In the vast majority of practical uses of ionic conductors, i.e., as electrolytes for dry cell batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization.

In addition, improved microelectronic circuit designs have generally decreased the current requirements for electronic devices. This in turn has enhanced the applicability of solid electrolyte power sources which usually can deliver currents only in the microampere range. These solid electrolyte systems have the inherent advantages of being free of electrolyte leakage and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds seeking to find compounds which are solid at room temperature and have specific conductances approaching those exhibited by the commonly used liquid systems. Solid electrolytes must be essentially electronic insulators so as not to internally short the cell while at the same time they must allow ionic migration in the crystal lattice for the cell to operate. It has been discovered that certain metallic salts which are solids at room temperature have specific conductances sufficiently high to permit their use in practical battery applications. For example, U.S. Pat. No. 3,723,185 discloses solid state electrolytes of compounds conforming to the general formula AgI-MCN-AgCn or modifications thereof where M is potassium, rubidium, cesium or mixtures thereof.

U.S. Pat. No. 4,331,750 discloses a cation conductive vitreous composition suitable for use as a solid electrolyte and having the general formula:

$$aP_2S_5, bLi_2S, cLiX$$

where:
X represents chlorine, bromine or iodine;
c is greater than or equal to 0;
the ratio b/(a+b) lies between 0.61 and 0.70; and
the ratio c/(a+b+c) is less than or equal to a limit which corresponds to solubility in the vitreous phase of LiX in the composition $aP_2S_5$, $bLi_2S$.

This reference also discloses that the use of various vitreous compositions that conduct cations has been recommended and that these compositions are included in the general formula:

$$aA_mY_n, bM_2Y, cMX$$

where:
A represents boron, silicon, germanium or phosphorus;
Y represents oxygen or sulfur;
m represents lithium or sodium; and
X represents chlorine, bromine or iodine and c can be equal to or greater than zero.

However, this reference further states that the conductivity at 25° C. of all compositions of the above type which were known was less than $10^{-5}$ ohm$^{-1}$ cm$^{-1}$ and that the $P_2S_5$-based compositions had a higher conductivity at ordinary temperature.

However, even though $P_2S_5$-based compositions are recited as forming good conductivity, their synthesis must be performed in sealed pressure vessels due to the volatility of $P_2S_5$. The high pressures generated at the fusion temperature of about 950° C. for $P_2S_5$-based materials coupled with the extreme reactivity of molten sulfides with common pressure vessel materials is a formidable technological obstacle to producing this solid electrolyte on a commercial basis for solid state cell systems.

It is an object of the present invention to provide a $SiS_2$-based vitreous lithium cation conductor which can be produced, at atmospheric pressure, which has a conductivity of at least $0.75 \times 10^{-4}$ ohm$^{-1}$ cm$^{-1}$ at 25° C. and which is suitable for use as a solid electrolyte in solid state cell systems.

Another object of the present invention is to provide a solid electrolyte comprising a vitreous lithium cation conductor of the composition:

$$SiS_2, xLi_2S, yLiI$$

where
x is from 0.8 to 1.5,
y is from 0 to about 2 and said composition having a conductivity of at least $0.75 \times 10^{-4}$ ohm$^{-1}$ cm$^{-1}$ at 25° C.

Another object of the present invention is to provide a solid electrolyte comprising a vitreous lithium cation conductor of the composition $SiS_2$, $Li_2S$, LiI and having a conductivity of at least $10^{-4}$ ohm$^{-1}$ cm$^{-1}$ at 25° C.

The foregoing and additional objects will become more fully apparent from the following description.

DISCLOSURE OF THE INVENTION

The invention relates to a solid electrolyte comprising a vitreous lithium cation conductor of the composition:

$$SiS_2, xLi_2S, yLiI$$

where
x is from 0.8 to 1.5, y is from 0 to about 2 and said vitreous lithium cation conductor having a conductivity at 25° C. of at least $0.75 \times 10^{-4}$ ohm$^{-1}$ cm$^{-1}$, preferably at least $10^{-4}$ ohm$^{-1}$ cm$^{-1}$.

Preferably, x should be about 1 to about 1.2 and y should be about 0.75 to about 1.2. As used herein, vitreous shall mean a composition in a glassy (non-crystalline) state and shall also include materials that have been cooled so rapidly from the molten condition that crystal formation is prevented.

The conductivity of $SiS_2$, $Li_2S$, LiI (LiI.$Li_2SiS_3$) vitreous material according to this invention was found to be at least $6 \times 10^{-4}$ ohm$^{-1}$ cm$^{-1}$ at 25° C. The conductivity of $Li_2SiS_3$ vitreous material according to this invention can be at least $0.75 \times 10^{-4}$ ohm$^{-1}$ cm$^{-1}$ at 25° C., preferably at least $0.9 \times 10^{-4}$ ohm$^{-1}$ cm$^{-1}$ at 25° C. Accordingly, the conductivity of the vitreous materials of this invention having a "y" value above 0 will be greater than $0.75 \times 10^{-4}$ ohm$^{-1}$ cm$^{-1}$ at 25° C.

Vitreous $Li_2SiS_3$ can be prepared at 1 atmosphere pressure by first mixing silicon disulfide ($SiS_2$) and lithium sulfide ($Li_2S$) in 1:1 mole ratio in an inert gas filled dry box. The mixture is then placed in a vitreous carbon crucible which in turn is placed in a inert gas reaction chamber. The $SiS_2$ and $Li_2S$ mixture is heated at an elevated temperature for a time period sufficient for the $SiS_2$ to react with the $Li_2S$ to form $Li_2SiS_3$. Generally, the $SiS_2$ and $Li_2S$ mixture can be heated at about 950° C. for about 6 hours. The $Li_2SiS_3$ is then quenched to ambient temperature (about 20° C.) to form the vitreous solid. If desired, lithium iodide (LiI) can be added by grinding together the vitreous $Li_2SiS_3$ and LiI, placing the mixture in a vitreous carbon crucible and then heating the mixture at an elevated temperature for a time period sufficient to form a solid solution of LiI in the $Li_2SiS_3$ material. The material is then quenched to room temperature. Generally the mixture can be heated at about 950° C. for about 6 hours and then quenched to room temperature.

Anode materials suitable for use with the solid electrolyte of this invention include lithium, silver, sodium, potassium, and rubidium. The preferred anode material is lithium.

Cathodes suitable for use with the solid electrolyte of this invention include poly(N-vinylpyrrolidone) (PVP)+iodine, PVP+iodine+$TiS_2$, $FeS_2$, $Sb_2S_3$, $TiS_2$, organic charge transfer complexes with halogens, and $MnO_2$.

EXAMPLE 1

Vitreous $Li_2SiS_3$ was prepared by mixing 67 grams $SiS_2$ and 33 grams $Li_2S$ in 1:1 mole ratio in a helium filled dry box. The mixture was placed in a vitreous carbon crucible which in turn was placed in a vitreous silica reaction tube. The tube was closed and was equipped with a conventional exhaust vent and a small conventional intake feed tube adapted for feeding helium into the reaction tube. The $SiS_2$ and $Li_2S$ mixture, under a 1 atmosphere pressure of helium, was heated at 950° C. for 6 hours and then the reaction tube was quenched to room temperature (20° C.) by submerging the reaction tube in cold water. The vitreous $Li_2SiS_3$ solid electrolyte produced was then ground, pelletized and tested in the conventional manner. It was found to have a conductivity of about $0.73 \times 10^{-4}$ ohm$^{-1}$ cm$^{-1}$ at 25° C.

Specifically the conductivity was measured by pelletizing (via the application of uniaxial pressure) the powdered material between titanium disulfide electrodes at 13,000 psi in a conventional steel mold with steel rams. The disc of solid electrolyte with $TiS_2$ electrodes was ejected from the mold and then heat sealed in a polyethylene bag. The sample sealed in the bag was then placed in an alcohol filled polytetrafluoroethylene cylinder with a tight fitting lid which was in turn placed in a large steel mold fitted with steel rams. The alcohol filled polytetrafluoroethylene cylinder containing sample was then compressed to 54,000 psi which results in an isostatic compression of the glass sample disc and its associated electrodes. The $TiS_2$/solid electrolyte/$TiS_2$ sample was placed in a spring-loaded holder fitted with gold contacts. The conductivity of the sample was measured using the complex plane technique first applied to solid electrolytes by J. E. Bauerle, J. Phys. Chem. Solids, 30, 2657 (1969). The complex plane technique is at present almost universally applied for the measurement of conductivity of solid electrolytes.

EXAMPLE 2

A vitreous $Li_2SiS_3$ was produced as in Example 1 except that it was produced in a 10 gram batch. The conductivity was found to be $0.97 \times 10^{-4}$ ohm$^{-1}$ cm$^{-1}$ at 25° C.

EXAMPLE 3

51 grams of the vitreous $Li_2SiS_3$ produced as in Example 1 was combined with 49 grams of LiI. The mixture was ground, placed in a vitreous carbon crucible as in Example 1 and then placed in a reaction tube. Under 1 atmosphere helium pressure, the $Li_2SiS_3$ and LiI mixture was heated at 950° C. for 6 hours and then the reaction tube was quenched to room temperature (20° C.) by submerging the reaction tube in cold water. The vitreous LiI.$Li_2SiS_3$ solid electrolyte produced was ground, pelletized and tested as described in Example 1. It was found to have a conductivity of $6.4 \times 10^{-4}$ ohm$^{-1}$ cm$^{-1}$ at 25° C.

EXAMPLE 4

Vitreous 1.18 LiI+$Li_2SiS_3$ was produced as generally described in Example 3 and tested as described in Example 2 and found to have a conductivity of $4.1 \times 10^{-4}$ ohm$^{-1}$ cm$^{-1}$ at 25° C.

EXAMPLE 5

A 0.787 inch diameter by 0.063 inch high coin cell was constructed as follows. A cathode composed of poly(N-vinylpyrrolidone), iodine and $TiS_2$ was prepared by ball milling these three components together with a solid electrolyte to insure homogeneity and then pelletizing the mixture. The PVP+$I_2$+$TiS_2$-containing cathode along with a separate layer of 0.75 LiI.$Li_2SiS_3$ electrolyte as prepared in the same manner as in Example 3 and a lithium anode were isotatically compressed at 25,000 psi as described in copending application Ser. No. 509,133 by J. R. Akridge and H. Vourlis and then assembled into the cell housing. The cell was continuously discharged across a 50 K-ohm load to a 1.0 volt cutoff. The voltage readings observed with time are shown in the Table.

| Li/0.75LiI.$Li_2$ $SiS_3$/PVP + $I_2$ + $TiS_2$ | |
|---|---|
| Voltage (volts) | Time (hours) |
| 2.31 | 50 |
| 2.19 | 150 |

-continued

| Li/0.75LiI.Li₂SiS₃/PVP + I₂ + TiS₂ | |
| --- | --- |
| Voltage (volts) | Time (hours) |
| 1.99 | 300 |
| 1.86 | 400 |
| 1.70 | 500 |
| 1.50 | 600 |
| 1.28 | 700 |
| 1.08 | 750 |

EXAMPLE 6

A cell was constructed as in Example 5 except the cathode was $Sb_2S_3$. The cell was continuously discharged across a 50 K-ohm load to a 1.0 volt cutoff and delivered 9.6 mAh.

The data presented in Examples 4 and 5 clearly demonstrate the suitability of the $SiS_2$-based vitreous lithium cation conductor of this invention as a solid electrolyte for solid state cell systems.

It should be understood that the foregoing disclosure relates to preferred embodiments of the invention and it is intended to cover all changes and modifications of the invention which do not depart from the spirit and scope of the appended claims.

I claim:

1. A solid electrolyte comprising a vitreous lithium cation conductor of the composition:

$$SiS_2, xLi_2S, yLiI$$

where
 x is from 0.8 to 1.5,
 y is from 0 up to about 2 and wherein said composition has a conductivity of at least $0.75 \times 10^{-4}$ ohm$^{-1}$ cm$^{-1}$ at 25° C.

2. The solid electrolyte of claim 1 wherein x is between about 1 and about 1.2 and y is between about 0.75 and about 1.2.

3. The solid electrolyte of claim 1 wherein the vitreous lithium cation conductor is $Li_2SiS_3$.

4. The solid electrolyte of claim 1 wherein the vitreous lithium cation conductor is $LiI.Li_2SiS_3$ and has a conductivity of at least $10^{-4}$ ohm$^{-1}$ cm$^{-1}$ at 25°0 C.

5. The solid electrolyte of claim 1 wherein the vitreous lithium cation conductor is $1.2LiI.Li_2SiS_3$ and has a conductivity of at least $10^{-4}$ ohm$^{-1}$ cm$^{-1}$ at 25° C.

6. A solid state cell comprising an anode, a cathode and a vitreous lithium cation electrolyte of the composition:

$$SiS_2, xLi_2S, yLiI$$

where
 x is from 0.8 to 1.5,
 y is from 0 up to about 2 and wherein said solid electrolyte has a conductivity of at least $0.75 \times 10^{-4}$ ohm$^{-1}$ cm$^{-1}$ at 25° C.

7. the solid state cell of claim 6 wherein x is between about 1 and about 1.2 and y is between about 0.75 and about 1.2.

8. The solid state cell of claim 6 wherein the electrolyte is $Li_2SiS_3$.

9. The solid state cell of claim 6 wherein the electrolyte is $LiI.Li_2SiS_3$ and has a conductivity of at least $10^{-4}$ ohm$^{-1}$ cm$^{-1}$ at 25° C.

10. The solid electrolyte of claim 6 wherein the vitreous lithium cation conductor is $1.2 LiI.Li_2SiS_3$ and has a conductivity of at least $10^{-4}$ ohm$^{-1}$ cm$^{-1}$ at 25° C.

11. The solid state cell of claim 6 wherein the anode is selected from the group consisting of lithium, sodium, potassium, rubidium, and silver.

12. The solid state cell of claim 6 wherein the cathode is selected from the group consisting of $TiS_2$, $PVP+I_2+TiS_2$, $FeS_2$, $PVP+I_2$, $Sb_2S_3$, and $MnO_2$.

13. The solid state cell of claim 6 wherein the anode is lithium, and the cathode is $TiS_2$.

14. The solid state cell of claim 6 wherein the anode is lithium and the cathode is $Sb_2S_3$.

15. The solid state cell of claim 6 wherein the anode is lithium and the cathode is $PVP+I_2+TiS_2$.

16. The solid state cell of claim 6 wherein the anode is lithium and the cathode is $FeS_2$.

17. The solid state cell of claim 6 wherein the anode is lithium and the cathode is $PVP+I_2$.

* * * * *

UNITED STATES PATENT AND TRADEMARK OFFICE
CERTIFICATE OF CORRECTION

PATENT NO. : 4,465,746
DATED : August 14, 1984
INVENTOR(S) : James Robert Akridge It is certified that error appears in the above-identified patent and that said Letters Patent is hereby corrected as shown below:

Column 1, Line 58, delete "AgCn" and substitute
  therefor --AgCN--.

Column 6, Claim 4, last line, delete "25° 0 C"
  and substitute therefor --25° C--.

Column 6, Claim 5, last line, delete "$cm^{31\ 1}$"
  and substitute therefor --$cm^{-1}$--.

Column 6, Claim 7, first line, delete "the"
  and substitute therefor --The--.

Signed and Sealed this

Twenty-fifth Day of June 1985

[SEAL]

Attest:

DONALD J. QUIGG

Attesting Officer    Acting Commissioner of Patents and Trademarks